Figure 1:
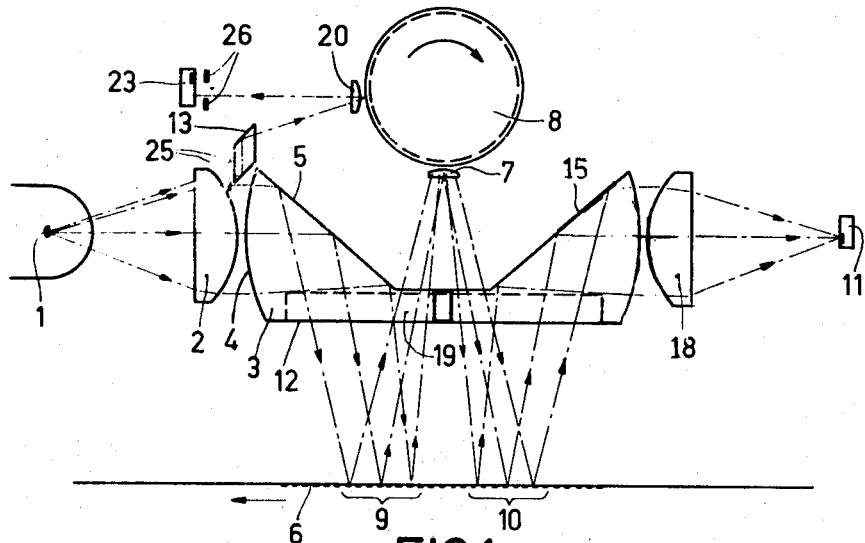

Feb. 27, 1968  S. ALBARDA  3,371,215
DEVICE FOR DEFINING THE DISPLACEMENT OF A MACHINE TOOL WITH
THE AID OF A RASTER AND ROTATING OPTICAL ELEMENT
Filed Oct. 8, 1965  2 Sheets-Sheet 1

INVENTOR.
SCATO ALBARDA
BY
[signature] Frank R. Trifari
AGENT

INVENTOR.
SCATO ALBARDA

United States Patent Office 3,371,215
Patented Feb. 27, 1968

3,371,215
DEVICE FOR DEFINING THE DISPLACEMENT OF A MACHINE TOOL WITH THE AID OF A RASTER AND ROTATING OPTICAL ELEMENT
Scato Albarda, Emmasingel, Eindhoven, Netherlands, assignor to North American Philips Company, Inc., New York, N.Y., a corporation of Delaware
Filed Oct. 8, 1965, Ser. No. 494,067
Claims priority, application Netherlands, Oct. 13, 1964, 64—11,872
6 Claims. (Cl. 250—237)

The invention relates to a device for defining the displacement of a machine tool component by means of a raster mechanically connected with said component and located in the optical path between a light source and a sensitive element for converting the incident light into an electrical signal.

In prior devices, a wound spiral is disposed in the light path between the light source and the raster in a plane transversing the light path. If the black or non-transparent spiral turns are opposite the reflecting parts of the raster, the light sensitive element does not receive light; if the transparent part of the spiral turns is opposite the reflecting parts of the raster, the light sensitive element receives a maximum quantity of light.

It will be obvious that a sinusoidal electrcial signal will be produced by the light-sensitive element, when the disc supporting the spiral rotates.

In the plane transversing the light path there is arranged a second raster, the elements of which have the same width and the same relative spacing as the raster connected with the tool component. The light striking the second raster does not attain the raster connected to the tool component. The light reflected by the second raster strikes a second light-sensitive element, which produces an electrical signal. This signal has a frequency which depends only upon the speed of rotation of the disc, on which the second raster and the spiral are fastened.

The signals provided by the two photocells (measuring signal and reference signal) have the same frequency but different phases, when the raster on the machine tool stands still.

By using the phase difference between the two signals interpolation can provide an accurate localisation of the raster on the machine tool.

The known device has a number of disadvantages which become particularly manifest if it is desired to represent the phase difference digitally and to so define accurately the locus within one pitch of the raster. In the first place, the device is in principle comparatively bulky, since an adaptation between the spiral turns on the disc and a repeating pattern in the form of a reflection raster on the machine tool is possible only, if the pitch of the spiral varies little with the diameter of the disc. This would require a large diameter of disc.

In the second place a number of revolutions of the disc above 3000 rev./min, is not well feasible. With a five-turn spiral the frequency of 250 c./s. corresponding thereto would mean that digitalisation servo systems responding to signals exceeding 100 c./s. cannot be connected effectively.

In the third place, play in the bearing of the disc reveals itself in an erroneous indication, since the rotating spiral raster exerts a translation movement with respect to the raster on the tool.

The invention has for its object to obviate these disadvantages and is characterized in that apart from the raster a rotating light-reflecting, regular polyhedron is arranged in the light path, so that the light beam striking the polyhedron after cooperation with the raster again interacts with the raster, and then strikes the light-sensitive element.

According to a further feature the raster is arranged in the focal plane of a lens, which is disposed between the rotating polyhedron and the raster so that the distance between the lens and the outer surfaces of the polyhedron facing the raster is small as compared with the focal distance of the lens.

According to a further feature the pitch of the raster is an integral fraction of $2\pi \frac{f}{n}$ wherein $f$ is the focal distance of the lens and $n$ is the number of outer surfaces of the polygon.

The invention will be described more fully with reference to the drawing, which shows in FIG. 1 a device according to the invention, in FIGS. 2 and 3 the incorporation of the device of FIG. 1 in a machine tool and in FIG. 4 the path of the rays in part of the device of FIG. 1.

In the device shown in FIG. 1 the lamp 1 projects through the condenser lens 2 light onto the body 3, which is formed by a notched spherical disc. The light rays enter the body 3 through the spherical surface 4, which operates as a condenser lens, are completely reflected at the flat boundary face 5 and emerge through the flat boundary face 12. The rays then strike the reflection raster 6. The latter consists of alternating reflective and black lines of definite width.

The light rays striking the reflecting lines are reflected, pass through the narrowed portion 19 of the body 3 and through the lens 7, striking the mirror polyhedron 8, located immediately behind the lens 7. Since the raster 6 substantially coincides with the focal plane of the lens 7, the part 9 of the raster is reproduced by the lens 7 and the polyhedron 8 on the part 10 of the raster 6.

The images formed by each of the facets of the polyhedron 8 struck by the rays are spaced apart by distances $d$, equal to $$2f \sin \frac{2\pi}{n}$$

Figure 4:
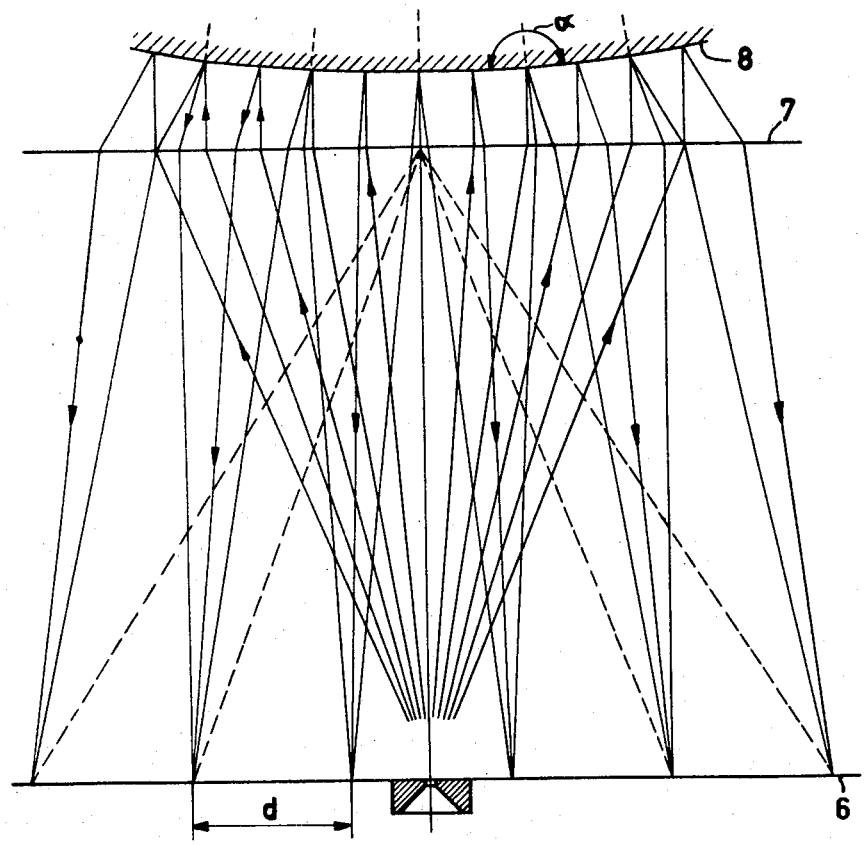

(see also FIG. 4). If the pitch $s$ of the raster 6 is chosen to be equal to $d$, the images are spaced apart by the pitch distance.

If the projected image strikes a reflecting part of the part of the raster part 10, the light rays are again reflected through the flat face 12 and reenter the notched spherical disc 3 the light is totally reflected at the flat boundary face 15 and strikes the photocell 11. If the projected image strikes a dark spot of the part 10 of the raster 6, the photocell 11 does not receive light.

When the raster moves in the direction of the arrow, the projection of the part 9 on the part 10 of the raster 6 moves in a direction opposite the direction of movement. The result is that after a displacement through half a pitch the light striking the photocell 11 has the same phase as prior to the displacement.

It has been assumed so far that the polyhedron 8 is in a rest position. In fact, the polyhedron 8 rotates. If $p$ is the number of revolutions per second and $n$ the number of boundary faces of the polyhedron 8, the speed of the movement of the projection of the raster part 9, when the raster is at a standstill, along the part 10 is equal to $dpn$. The light received by the photocell 11 thus has an intensity which varies with a frequency $dpn/s$. If $d=s$, this frequency is $pn$.

When the raster moves and the polyhedron rotates, the real movement is added to or subtracted from the apparent movement of the picture along the raster 6 owing to the rotation.

Since the pick-up devices of the kind described have the advantage that the data supplied are in the form of altermating-voltage signals and A.C. amplifiers can be used, the real movement of the pick-up with respect to the raster must never neutralise the apparent movement. A reasonable limit of the real speed of movement may be ½ dpn.

Apart from the signal photocell 11, there is provided a reference photocell 23. Part of the light beam from the lamp 1 is deflected by means of a prism 13 and, subsequent to reflection from the polyhedron 8, it strikes the photocell 23. The deflected beam enters the prism 13 through the gap of the diaphragm 25. The diaphragm 25 is located at the focal point of the lens 29. This also applies to the diaphragm 26, which is disposed immediately in front. The reference signal produced by the photocell will therefore have a frequency $pn$, independent of the relative movement of the raster 6 with respect to the photocell 11.

The electronic processing of two phase-shifted signals (measuring signal and reference signal) by means counting of pulses from an independent oscillator during the phase difference interval is a simple and well known operation.

Figure 2:
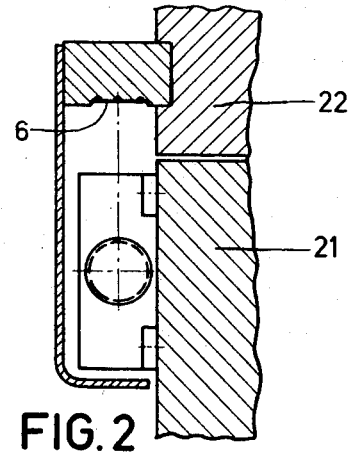
Figure 3:
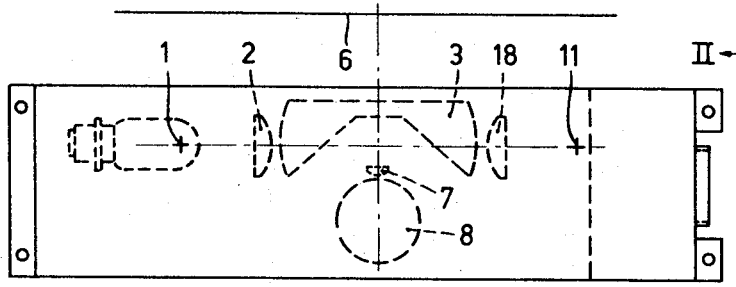

FIGS. 2 and 3 show the position of the device of FIG. 1 with respect to the bed 21 and the sledge 22 of a lathe. In one embodiment the pitch of the reflection raster 6 was 2 mms. The number of facets $n$ of the polyhedron 8 was 180. The cross section of the polyhedron 8 was 30 mm., the speed was 375 revolutions a minute. The focal distance $f$ of the lens 7 was 57.3 mms.

The distance between the consecutive images in the part 10 of the raster 6 was $$d = 2 \cdot \frac{2\pi}{n} f = 2 \cdot \frac{2\pi}{180} \cdot 57.3 = 4 \text{ mms.}$$

Therefore the images are spaced apart from each other by a distance equal to two pitches.

With a stationary raster the signal frequency was 2250 c./s. and the reference signal had a frequency of 1125 c./s. The speed $$dpn \text{ is } 4 \cdot \frac{375}{60} \cdot 180 = 4500 \text{ mms./sec.} = 4.5 \text{ ms./sec.}$$

so that a translation speed of $$\frac{1}{2} \cdot 4, 5.60 = 135 \text{ ms./min.}$$

is permissible. In the known device a speed of 15 ms./min. is permissible.

Of course, a polyhedron with $n=360$ may be chosen, so that the images are spaced apart from each other by the distance of one pitch, but such a polyhedron can be manufactured only with difficulty.

The striking advantages of a device according to the invention are:

(a) The high frequency of the measuring signal, so that high rates of displacement of the reflection raster are allowed.

(b) The low speed of revolution of the mirror polyhedron does not give rise to any difficulty in bearings.

(c) Play in bearings and eccentricity of the rotating polyhedron do not give rise to measuring errors, which is explained in a prior patent application Serial No. 421,935, filed Dec. 29, 1964.

(d) It occupies comparatively little space, so that there are no serious difficulties in building it in.

(e) There is a large free space between the reflection raster and the signal photocell, which is important with a view to maintenance.

What is claimed is:

1. An apparatus for determining the relative displacement of an object, with respect to a reference structure, comprising a raster secured to said object, said reference structure including a rotating reflecting polyhedron, means for directing an optical image of a first portion of said raster to said reflecting rotating polyhedron, means for directing the resultant image of said first raster portion from said rotating reflecting polyhedron to a second portion of said raster, and a photosensitive means responsive to the cyclical variation caused by the optical interference of the first raster portion image superimposed onto the second raster portion for indicating the relative displacement.

2. A device for defining the displacement of an element having movement relative to said device, comprising a light source, means forming a raster having alternating segments with complementary optical properties, said raster being movable in accordance with the movement of said element and in a direction substantially transverse to said alternating segments, means for directing light from said source toward said raster, a regular rotating polyhedron, each surface thereof being a reflective surface, focussing means positioned between said raster and said polyhedron for receiving light reflected from said raster, said raster lying in the focal plane of said focussing means, each of said surfaces in turn being positioned with respect to incident light thereon such that said incident light is redirected toward said raster, said redirected incident light forming an image of said raster having a virtual movement in opposition to the actual movement of said raster, and light sensitive means positioned with respect to said raster for indicating the total light resulting from the combined image of the virtual raster movement and the actual raster movement.

3. A device for defining the displacement of an element having movement relative to said device and comprising a source of light, a raster having alternating segments with complementary optical properties, said raster movable in accordance with the movement of said element and in a direction substantially transverse to said alternating segments, first focussing means focussing light from said source toward said raster, a regular rotating polyhedron, each surface thereof comprising a reflective surface, second focussing means positioned between said raster and said polyhedron for receiving light reflected from said raster, said raster lying in the focal plane of said second focussing means, one of said surfaces of said polyhedron positioned immediately behind said second focussing means and further positioned with respect to incident light thereon such that said incident light is redirected toward said raster, said redirected incident light forming an image of said raster having a virtual movement in opposition to the actual movement of said raster, light sensitive means, and third focussing means for focussing the total light resulting from the combined image of the virtual raster movement and the actual raster movement onto said light sensitive means.

4. A device for defining the displacement of an element having movement relative to said device, and comprising a source of light, a raster having alternating segments with complementary optical properties, said raster movable in accordance with the movement of said element and in a direction substantially transverse to said alternating segments, first focussing means focussing light from said source toward said raster, a regular rotating polyhedron, each surface thereof comprising a reflective surface, second focussing means positioned between said raster and said polyhedron for receiving light reflected from said raster, said raster lying in the focal plane of said second focussing means, one of said surfaces of said polyhedron positioned immediately behind said second focussing means and further positioned with respect to incident light thereon such that said incident light is redirected toward said raster, said redirected incident light forming an image of said raster having a virtual movement in opposition to the actual movement of said raster, first light sensitive means, third focussing means for focussing the total light resulting from the combined image of the virtual raster movement and the actual raster movement onto said first light sensitive means, second light sensitive means, and fourth focussing means for directing light from said source to the surface of said polyhedron, said source light thereby being redirected to said second light sensitive means, said second light sensitive means giving an indication of the rotation of said polyhedron independent of the movement of said raster, said first and second light sensitive means together defining said displacement.

5. A device as claimed in claim 1, wherein the raster is arranged in the focal plane of a lens which is disposed between the rotating polyhedron and the raster so that the distance between the lens and the outer surfaces of the polyhedron facing the raster is small as compared with the focal distance of the lens.

6. A device as claimed in claim 5, wherein the pitch of the raster is an integral fraction of $$2\pi \frac{f}{n}$$

wherein $f$ is the focal distance of the lens and $n$ is the number of outer surfaces of the polyhedron.

References Cited
UNITED STATES PATENTS

| | | |
|---|---|---|
| 2,007,594 | 7/1935 | Browne. |
| 2,857,802 | 10/1958 | Carl. |
| 2,861,345 | 11/1958 | Spencer. |
| 2,886,717 | 5/1959 | Williamson et al. |
| 3,153,111 | 10/1964 | Barber et al. |

RALPH G. NILSON, *Primary Examiner.*

M. ABRAMSON, *Assistant Examiner.*

UNITED STATES PATENT OFFICE
CERTIFICATE OF CORRECTION

Patent No. 3,371,215                      February 27, 1968

Scato Albarda

It is certified that error appears in the above identified patent and that said Letters Patent are hereby corrected as shown below:

Column 1, line 57, cancel "of". Column 3, line 13, after "front" insert -- of the photocell 23 --; line 14, after "cell" insert -- 23 --; line 18, after "means" insert -- of --; line 19, cancel "of"; line 74, "reflecting rotating" should read -- rotating reflecting --.

Signed and sealed this 30th day of December 1969.

(SEAL)
Attest:

Edward M. Fletcher, Jr.                WILLIAM E. SCHUYLER, JR.
Attesting Officer                        Commissioner of Patents